United States Patent [19]
Minagawa et al.

[11] 4,146,518
[45] Mar. 27, 1979

[54] STABILIZED HALOGEN-CONTAINING RESIN COMPOSITION

[75] Inventors: Motonobu Minagawa, Koshigawa; Tetsuo Sekiguchi, Hasuda, both of Japan

[73] Assignee: Argus Chemical Corporation, Brooklyn, N.Y.

[21] Appl. No.: 817,575

[22] Filed: Jul. 21, 1977

[30] Foreign Application Priority Data

Jul. 30, 1976 [JP] Japan .................................. 51-91157

[51] Int. Cl.² ........................... C08K 5/58; C08K 5/57
[52] U.S. Cl. ................................ 260/23 XA; 252/404; 252/406; 260/45.75 S; 260/45.75 T; 260/45.75 K
[58] Field of Search .................. 260/45.25 K, 45.75 S, 260/45.75 T, 23 XA; 252/404, 406

[56] References Cited
U.S. PATENT DOCUMENTS

| | | | |
|---|---|---|---|
| 3,021,302 | 2/1962 | Frey et al. | 260/45.75 S |
| 3,565,930 | 2/1971 | Kauder | 260/45.75 S |
| 3,565,931 | 2/1971 | Brecker | 260/45.75 S |
| 3,609,120 | 9/1971 | Hoye | 260/45.75 S |

FOREIGN PATENT DOCUMENTS 2306208 3/1976 France.

Primary Examiner—V. P. Hoke
Attorney, Agent, or Firm—Otto S. Kauder

[57] ABSTRACT

A stabilized halogen-containing resin composition by incorporating therein (a) at least one kind of mono alkyltin compounds or dialkyltin compounds and (b) at least one kind of monoalkoxycarbonylalkyltin compounds or bis(alkoxycarbonylalkyl)tin compounds.

16 Claims, No Drawings

STABILIZED HALOGEN-CONTAINING RESIN COMPOSITION

This invention relates to a stabilized halogen-containing resin composition comprising alkyltin compounds and alkoxycarbonylalkyltin compounds as stabilizers.

Typical monoalkyltin compounds and dialkyltin compounds used in this invention are methylstannoic acid, butylstannoic acid, octylstannoic acid, dimethyltin oxide, dibutyltin oxide, dioctyltin oxide, dimethyltin sulfide, dibutyltin sulfide, dioctyltin sulfide, dicyclohexyltin sulfide, monobutyltin oxide.sulfide, methylthiostannoic acid, butylthiostannoic acid, octylthiostannoic acid, dibutyltin dilaurate, dibutyltin distearate, dioctyltin dioleate, dibutyltin basic laurate, dibutyltin dicrotonate dibutyltin bis(butoxydiethyleneglycolmaleate), dibutyltin dimethacrylate, dibutyltin dicinnamate, dioctyltin bis(oleylmaleate), dibutyltin bis(stearylmaleate), dibutyltin itaconate, dioctyltin maleate, diamyltin bis(cyclohexylmaleate), dimethyltin dicrotonate, diethyltin bis(isooctylcitraconate), dipropyltin bis(benzylmaleate), diisobutyltin bis(propylmaleate), dicyclohexyltin maleate, dioctyltin bis(butylmaleate), dibutyltin dimethoxide, dibutyltin dilauroxide, dioctyltin ethyleneglycoxide, pentaerythritoldibutyltin oxide condensate, dibutyltin bis(laurylmercaptide), dimethyltin (stearylmercaptide), monobutyltin tris(laurylmercaptide), dibutyltin-β-mercaptopropionate, dioctyltin-β-mercapto-propionate, dibutyltin mercaptoacetate, monobutyltin tris-(isooctylmercaptoacetate), monooctyltin tris(2-ethylhexylmercaptoacetate), dibutyltin bis(isooctylmercaptoacetate), dioctyltin bis(isooctylmercaptoacetate), dioctyltin bis(2-ethylhexylmercaptoacetate), dimethyltin bis(isooctylmercaptoacetate), dimethyltin bis(isooctylmercaptopropionate), monobutyltin tris(isooctylmercaptopropionate), bis[monobutyl-di(isooctoxycarbonylmethylthio)tin]sulfide, bis[dibutylmono (isooctoxycarbonylmethylmethylthio)tin]sulfide, monobutyl monochlorotin bis(isooctylmercaptopropionate), monobutyl monochlorotin bis(isooctylmercaptoacetate), monobutyl monochlorotin bis(laurylmercaptide), dibutyl monochlorotin stearate, dimethyltin ricinoleate, dibutyltin bis(2-ethoxyethyl-maleate), bis(dioctyltin laurate) maleate, bis(dioctyltin butylmaleate) maleate, bis(methyltin diisooctylthioglycolate) sulfide, bis(methyl/dimethyltin mono/diisooctylthioglycolate) disulfide, bis(methyltin diisooctylthioglycolate) trisulfide, bis(butyltin diisooctylthioglycolate) trisulfide.

Typical monoalkoxycarbonylalkyltin compounds and bis(alkoxycarbonylalkyl)tin compounds used in this invention are 2-methoxycarbonylethyltin tris(butylthioglycolate), 2-ethoxycarbonyl-ethyltin tris(isooctylmercaptopropionate), 2-butoxycarbonylethyltin tris(stearylmercaptopropionate), 2-methoxycarbonylethyltin tris(isooctylthioglycolate), 2-methoxycarbonylpropyltin tris(octylthioglycolate), 2-methoxycarbonylethyltin tris(2-ethylhexylmercaptopropionate), bis(2-methoxycarbonylethyl)tin bis(isooctylthioglycolate), bis(2-methoxycarbonylethyl)tin bis(2-ethylhexylthioglycolate), bis(2-methoxycarbonylethyl)tin bis(2-ethylhexylthioglycolate), bis(2-butoxycarbonylethyl) tin bis(butylthioglycolate), bis(2-methoxycarbonylethyl)tin bis(stearylthioglycolate), bis(2-ethoxycarbonylpropyl)tin bis(laurylthioglycolate), bis(2-isopropoxycarbonylethyl)tin bis(isooctylthioglycolate), bis[bis(2-methoxycarbonylethyl) tin isooctylthioglycolate]sulfide, bis[bis(2-methoxycarbonylethyl)tin isooctylthioglycolate]disulfide, bis[bis(2-methoxycarbonylethyl)tin isooctylthioglycolate]tetrasulfide, bis[2-methoxycarbonylethyltin bis(2-ethylhexylthioglycolate)] sulfide, bis[2-methoxycarbonylethyltin bis(2-ethylhexylthioglycolate)]disulfide, bis[2-methoxycarbonylethyltin bis(2-ethylhexylthioglycolate)] tetrasulfide, bis[2-methoxycarbonylethyl/bis(2-methoxycarbonylethyl)tin mono/bis (isooctylthioglycolate)] sulfide, bis[2-methoxycarbonylethyl/bis(2-methoxycarbonylethyl)tin mono/bis(isooctylthioglycolate)] disulfide, bis[2-methoxycarbonylethyl/bis (2-methoxycarbonylethyl)tin mono/bis(isooctylthioglycolate)]tetrasulfide, 2-methoxycarbonylethyltin sulfide polymer, 2-ethoxycarbonylpropyltin sulfide polymer, 2-butoxycarbonylethyltin sulfide polymer, 2-isopropoxycarbonylethyltin sulfide polymer, bis(2-methoxycarbonylethyl)tin sulfide polymer, bis(2-methoxycarbonylethyl)tin sulfide polymer, bis(2-methoxycarbonylpropyl)tin sulfide polymer, bis(2-propoxycarbonylethyl)tin sulfide polymer, bis(2-ethoxycarbonylethyl)tin sulfide polymer, bis(2-methoxycarbonylethyl)tin thioglycolate polymer, bis(2-methoxycarbonylethyl)tin mercaptopropionate polymer, 2-methoxycarbonylethyltin oxide, bis(2-butoxycarbonylethyl)tin oxide, 2-octoxycarbonylethyltin oxide, 2-methoxycarbonylethyltin tris(laurylmercaptide), bis(lauroxycarbonylethyl)tin dilaurate, bis(2-methoxycarbonylpropyl)tin bis(stearylmercaptide), bis(2-methoxycarbonylethyl)tin bis(butylmaleate).

The alkyltin compounds and the alkoxycarbonylalkyltin compounds each is employed within the range from 0.01 to 5 parts by weight of the halogen-containing resin, preferably from 0.1 to 2.

The amount of total stabilizer is within the range from 0.1 to 5, preferably from 0.5 to 3.

EXAMPLE 1

To 100 parts of PVC (Geon 103EP-8), 1.5 parts of dibutyltin bis(isooctylthioglycolate) in experimental No.1-1, 1.0 part of dibutyltin bis(isooctylthioglycolate and 0.5 part of mono-butyltin tris(isooctylthioglycolate) in exp. No. 1-2, 1.0 part of dibutyltin bis(isooctylthioglycolate) and 0.5 parts of mono(methoxycarbonylethyl)tin tris(isooctylthioglycolate) in exp. No. 1-3 were added, and kneaded on roll, prepared a sheet with 1mm in thickness and tested.

The results are shown in Table 1.

Table 1

| Exp. No. | Heat Stability (195° C) min | Initial Color | Clarity | Time to Adhesion on Roll min |
| --- | --- | --- | --- | --- |
| 1-1 | 70 | medium | medium | 4 |
| 1-2 | 85 | a little superior | a little superior | 8 |
| 1-3 | 100 | excellent | excellent | 13 |

EXAMPLE 2

The same procedure in a combination of dioctyltin bis(isooctylthioglycolate) and bis(methoxycarbonylethyl) tin bis(isooctylthioglycolate) was followed in preparing and testing the sheets as in Example 1.

The results are shown in Table 2.

Table 2

| Exp. No. | Dioctyltin salt phr | Bis(methoxycarbonylethyl)tin salt phr | Heat Stability (195° C) min |
| --- | --- | --- | --- |
| 2-1 | 2.0 | 0 | 65 |

Table 2-continued

| Exp. No. | Dioctyltin salt | Bis(methoxycarbonyl-ethyl)tin salt | Heat Stability |
| --- | --- | --- | --- |
| 2-2 | 1.6 | 0.4 | 100 |
| 2-3 | 1.2 | 0.8 | 90 |
| 2-4 | 0.8 | 1.2 | 85 |
| 2-5 | 0.4 | 1.6 | 85 |
| 2-6 | 0 | 2.0 | 60 |

EXAMPLE 3

The same procedure in a combination of 1.0 part of dimethyltin bis(isooctyl$\beta$-mercaptopropionate) as alkyltin compound and 1.0 part of the compounds shown in Table 3 as alkoxycarbonylalkyltin compound was followed in preparing and testing the sheets as in Example 1.

The results are shown in Table 3.

Table 3

| Exp. No. | Alkoxycarbonylalkyltin Compounds | Heat Stability |
| --- | --- | --- |
|  |  | (200° C) min |
| 3-1 Control | dimethyltin bis(isooctyl-thioglycolate)2.0 | 80 |
| 3-2 | bis(ethoxycarbonylpropyl)tin dilaurate | 90 |
| 3-3 | bis(methoxycarbonylethyl)tin maleate | 100 |
| 3-4 | bis(methoxycarbonylethyl)tin bis(butylmaleate) | 105 |
| 3-5 | mono-methoxycarbonylethyltin tris(laurylmercaptide) | 95 |

EXAMPLE 4

The same procedure in a combination of 1.0 part of the compounds shown in Table 4 as alkyltin compounds and 0.5 part of mono-methoxycarbonylethyltin tris(2-ethylhexylthioglycolate) as alkoxycarbonylethyltin compounds was followed in preparing and testing the sheets as in Example 1.

The results are shown in Table 4.

Table 4

| Exp. No. | Alkyltin Compounds | Heat Stability |
| --- | --- | --- |
|  |  | (195° C) min |
| 4-1 Control | dioctyltin bis(2-ethyl-hexylthioglycolate)1.5 | 65 |
| 4-2 | dioctyltin sulfide | 90 |
| 4-3 | monooctyltin tris(2-ethylhexylthioglycolate) | 95 |
| 4-4 | dioctyltin dilaurate | 80 |
| 4-5 | dioctyltin maleate polymer | 100 |
| 4-6 | dioctyltin$\beta$-mercaptopropionate | 100 |

EXAMPLE 5

To polymer blend of 80 parts of PVC (Geon 103EP8) and 20 parts of ABS (Kane Ace B-28), 0.5 part of Castearate as lubricant, and 1.5 parts of dibutyltin bis(isooctylthioglycolate) in experimental No. 5-1, 1.0 part of dibutyltin bis(isooctylthioglycolate) and 0.5 part of monobutyltin tris(isooctylthioglycolate) in exp. No. 5-2, 1.0 part of dibutyltin bis(isooctylthioglycolate) and 0.5 part of mono-methoxycarbonylethyltin tris(isooctylthioglycolate) in exp. No. 5-3, 0.5 part of monobutyltin tris(isooctylthioglycolate) and 1.0 part of bis(methoxycarbonylethyl)tin bis(isooctylthioglycolate) in exp. No. 5-4 as stabilizers were added, and kneaded on roll, prepared a sheet with 1mm in thickness and tested.

The results are shown in Table 5.

Table 5

| Exp. No. | Heat Stability | Initial Color | Clarity | Time to Adhesion on Roll |
| --- | --- | --- | --- | --- |
|  | (200° C) min |  |  | min |
| 5-1 | 70 | medium | medium | 2 |
| 5-2 | 85 | superior | superior | 6 |
| 5-3 | 115 | excellent | excellent | 10 |
| 5-4 | 105 | " | " | 14 |

We claim:

1. A stabilizer composition capable of enhancing the ease of processing and resistance to discoloration on heating of a polyvinyl chloride resin at 190° C. consisting essentially of (A) at least one alkoxycarbonylalkylenestannane having linked to tin through carbon one to two alkoxycarbonylalkylene groups having 1 to 30 carbon atoms in the alkoxy group and 2 and 3 carbon atoms in the alkylene group selected from the group consisting of alkoxycarbonylalkylenestannane mercaptides, alkoxycarbonylalkylenestannane mercaptide-sulfides, alkoxycarbonylalkylenestannane sulfides. alkoxycarbonylalkylenestannane oxides, and alkoxycarbonylalkylenestannane carboxylates, and (B) at least one alkylstannane having linked to tin through carbon one to two alkyl groups having 1 to 12 carbon atoms selected from the group consisting of alkylstannoic acids, dialkyltin oxides, dialkyltin sulfides, alkylthiostannoic acids, dialkyltin carboxylates, monoalkyltin mercaptides, dialkyltin mercaptides, monoalkyltin mercaptide-sulfides, dialkyltin mercaptide-sulfides, and monoalkyltin chloromercaptides, the weight proportions of alkoxycarbonylalkylenestannane to alkylstannane in the stabilizer composition ranging from 1:1 to 1:9.

2. A stabilizer composition according to claim 1 in which the alkoxycarbonylalkylenestannane is an alkoxycarbonylalkylenestannane sulfide.

3. A stabilizer composition according to claim 1 in which the alkoxycarbonylalkylenestannane is an alkoxycarbonylalkylenestannane mercaptide.

4. A stabilizer composition according to claim 1 in which the alkoxycarbonylalkylenestannane is an alkoxycarbonylalkylenestannane carboxylate.

5. A stabilizer composition according to claim 2 in which the alkoxycarbonyl alkylenestannane sulfide is bis(2-ethoxycarbonylethyl)tin sulfide polymer.

6. A stabilizer composition according to claim 3 in which the alkoxycarbonylalkylenestannane mercaptide is 2-methoxycarbonylethyltin tris(isooctylthioglycolate).

7. A stabilizer composition according to claim 4 in which the alkoxycarbonylalkylenestannane carboxylate is bis(methoxycarbonylethyl) tin maleate.

8. A stabilizer composition according to claim 1 in which the alkylstannane is a monoalkyltin mercaptide.

9. A stabilizer composition according to claim 1 in which the alkylstannane is a dialkyltin carboxylate.

10. A stabilizer composition according to claim 1 in which the alkylstannane is an alkylthiostannoic acid.

11. A stabilizer composition according to claim 1 which is a homogeneous storage-stable liquid at 20° C.

12. A stabilizer composition according to claim 1 containing as an additional ingredient a compound selected from the group consisting of hindered phenols, monocarboxylate salts of zinc, magnesium, calcium, strontium, barium, sodium and potassium, hydrocarbon substituted phenol salts of barium, and 1,2-epoxides having 15 to 75 carbon atoms.

13. A polyvinyl chloride resin composition having enhanced ease of processing and resistance to discoloration upon heating at 190° C. comprising a polyvinyl chloride resin and a stabilizer composition according to claim 1.

14. A polyvinyl chloride composition according to claim 13 in which the quantity of stabilizer composition is 0.1 to 5 parts by weight per 100 parts of polyvinyl chloride resin.

15. A stabilizer composition according to claim 1 in which the alkylstannane is a dialkyltin mercaptide.

16. A stabilizer composition according to claim 1 in which the alkylstannane is a dialkyltin sulfide.

* * * * *